(12) United States Patent
Lu et al.

(10) Patent No.: US 10,067,298 B2
(45) Date of Patent: Sep. 4, 2018

(54) FIBER OPTIC CABLE CONNECTOR ASSEMBLY INCLUDING INTEGRATED ENHANCED FUNCTIONALITY

(71) Applicant: CommScope Technologies LLC, Hickory, NC (US)

(72) Inventors: Yu Lu, Eden Prairie, MN (US); Michael Aaron Kadar-Kallen, Harrisburg, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/889,810

(22) Filed: Feb. 6, 2018

(65) Prior Publication Data

US 2018/0224609 A1 Aug. 9, 2018

Related U.S. Application Data

(63) Continuation of application No. 14/907,209, filed as application No. PCT/US2014/047601 on Jul. 22, 2014.

(60) Provisional application No. 61/857,040, filed on Jul. 22, 2013.

(51) Int. Cl.
| | |
|---|---|
| *G02B 6/26* | (2006.01) |
| *G02B 6/38* | (2006.01) |
| *G02B 6/28* | (2006.01) |
| *G02B 6/14* | (2006.01) |
| *G02B 6/028* | (2006.01) |

(52) U.S. Cl.
CPC ......... *G02B 6/3845* (2013.01); *G02B 6/0286* (2013.01); *G02B 6/14* (2013.01); *G02B 6/2821* (2013.01); *G02B 6/3846* (2013.01); *G02B 6/3895* (2013.01)

(58) Field of Classification Search
CPC ...... G02B 6/3845; G02B 6/0286; G02B 6/14; G02B 6/2821; G02B 6/63846; G02B 6/3895
USPC ............................................. 385/28, 53–94
See application file for complete search history.

(56) References Cited

U.S. PATENT DOCUMENTS

| | | |
|---|---|---|
| 4,165,496 A | 8/1979 | Di Domenico, Jr. et al. |
| 4,423,922 A | 1/1984 | Porter |
| 4,767,171 A | 8/1988 | Keil et al. |

(Continued)

FOREIGN PATENT DOCUMENTS

| | | |
|---|---|---|
| CN | 1409140 A | 4/2003 |
| EP | 0 646 812 A1 | 4/1995 |

(Continued)

OTHER PUBLICATIONS

Chanclou et al. "Collective Microoptics on Fiber Ribbon for Optical Interconnecting Devices." J. of Lightwave Tech. vol. 17, No. 5. May 1999, pp. 924-928.

(Continued)

*Primary Examiner* — Ryan Lepisto
*Assistant Examiner* — Guy Anderson
(74) *Attorney, Agent, or Firm* — Merchant & Gould P.C.

(57) ABSTRACT

A fiber optic cable and connector assembly is disclosed. The assembly includes a cable optical fiber, a ferrule, a stub optical fiber having a first portion supported within the ferrule a second portion the projects rearwardly the ferrule and a signal modification structure optically coupled between the stub optical fiber and the cable optical fiber.

20 Claims, 7 Drawing Sheets

(56) References Cited

U.S. PATENT DOCUMENTS

| | | |
|---|---|---|
| 4,801,185 A | 1/1989 | Bricheno |
| 5,317,663 A | 5/1994 | Beard et al. |
| 5,367,594 A | 11/1994 | Essert et al. |
| 5,497,438 A | 3/1996 | Ishikawa et al. |
| 5,680,237 A | 10/1997 | Cheng |
| 6,014,483 A | 1/2000 | Thual et al. |
| 6,485,191 B1 | 11/2002 | Sato |
| 6,612,751 B1 | 9/2003 | Watanabe et al. |
| 6,839,483 B2 | 1/2005 | Reed et al. |
| 6,840,684 B2 | 1/2005 | Melchoir et al. |
| 7,031,567 B2 | 4/2006 | Grinderslev et al. |
| 7,090,407 B2 | 8/2006 | Melton et al. |
| 7,155,096 B2 | 12/2006 | Chanclou et al. |
| 7,333,702 B2 | 2/2008 | Fujita et al. |
| 7,711,220 B2 | 5/2010 | Scofet et al. |
| 7,744,286 B2 | 6/2010 | Lu et al. |
| 7,835,603 B2 | 11/2010 | De Barros et al. |
| 7,920,763 B1 | 4/2011 | Shou et al. |
| 8,419,622 B2 | 4/2013 | Shimotsu |
| 8,837,885 B2 | 9/2014 | Sec et al. |
| 8,942,531 B2 | 1/2015 | Donlagic et al. |
| 9,829,647 B2 * | 11/2017 | Lu .................... G02B 6/3846 |
| 2002/0146211 A1 | 10/2002 | Stevens et al. |
| 2003/0005918 A1 | 3/2003 | Tamura et al. |
| 2003/0142918 A1 | 7/2003 | Melchior et al. |
| 2005/0111782 A1 | 5/2005 | Donval et al. |
| 2005/0265653 A1 | 12/2005 | Cai et al. |
| 2007/0031095 A1 | 2/2007 | Fujita et al. |
| 2007/0077014 A1 | 4/2007 | Gaeta et al. |
| 2007/0274657 A1 * | 11/2007 | Billman ............... G02B 6/3802 385/134 |
| 2008/0219624 A1 | 9/2008 | Pimpinella et al. |
| 2009/0202201 A1 | 8/2009 | Scofet et al. |
| 2010/0124394 A1 | 5/2010 | Meek et al. |
| 2010/0329612 A1 | 12/2010 | Everett et al. |
| 2010/0331626 A1 | 12/2010 | Shimotsu |
| 2011/0008003 A1 | 1/2011 | Tamekuni et al. |
| 2012/0155807 A1 | 6/2012 | Knapp |
| 2012/0189252 A1 | 7/2012 | Bhagavatula et al. |
| 2012/0321256 A1 | 12/2012 | Caveney et al. |
| 2013/0004129 A1 | 1/2013 | Zhang |
| 2013/0039622 A1 | 2/2013 | Grinderslev |
| 2013/0156382 A1 | 6/2013 | Park |
| 2013/0163930 A1 | 6/2013 | Jian |
| 2013/0183030 A1 | 7/2013 | Duis et al. |
| 2014/0064665 A1 | 3/2014 | Ott et al. |
| 2015/0063754 A1 | 3/2015 | Li et al. |
| 2016/0077288 A1 | 3/2016 | Waite et al. |
| 2016/0161678 A1 | 6/2016 | Lu et al. |
| 2016/0178851 A1 | 6/2016 | Lu et al. |

FOREIGN PATENT DOCUMENTS

| | | |
|---|---|---|
| EP | 2 413 171 A1 | 2/2012 |
| JP | H04-355415 A | 12/1992 |
| JP | H5-11139 A | 1/1993 |
| JP | 2004-286843 A | 10/2004 |
| JP | 2005-043442 A | 2/2005 |
| JP | 2007-226119 A | 9/2007 |
| JP | 2008-083622 A | 4/2008 |
| JP | 2009-175612 A | 8/2009 |
| JP | 2013-109351 A | 6/2013 |
| WO | 2007/096584 A2 | 8/2007 |

OTHER PUBLICATIONS

Chanclou et al. "Design and Performance of Expanded Mode Fiber Using Microoptics." J. of Lightwave Tech. vol. 20, No. 5. May 2002, pp. 836-842.

Fiber Optics-Fiber Basics Handout. Newport—Photonics Technical Note #2 (6 pages). Known Prior Art.

Gravey et al. "Expanded Single Mode Fiber"© 2001 OSA/OFC (3 pages).

International Search Report and Written Opinion for International Application No. PCT/US2014/047592 dated Nov. 18, 2014 (19 pages).

International Search Report and Written Opinion for International Application No. PCT/US2014/047601 dated Nov. 7, 2014 (12 pages).

McGrath et al., "Manufacturing's New Economies of Scale," Harvard Business Review, 18 pp (May-Jun. 1992).

European Search Report for EP Application No. 14828755.0 dated Feb. 6, 2017 (7 pages).

Horche et al. "Spectral Behavior of a Low-Cost All-Fiber Component Based on Untapered Multifiber Unions." IEEE Photonics Technology Letters. vol. 1, No. 7, Jul. 1989, pp. 184-187.

Li et al. "Demonstration of high extinction ratio modal interference in a two-mode fiber and its applications for all-fiber comb filter and high-temperature sensor." Optics Communcations. vol. 250 (2005) pp. 280-285.

Mohammed et al. "All-fiber multimode interference bandpass filter." Optics Letters, vol. 31, No. 17. (Sep. 1, 2006) pp. 2547-2549.

Mohammed et al. "Wavelength Tunable Fiber Lens Based on Multimode Interference." Journal of Lightwave Technology, vol. 22, No. 2. Feb. 2004. pp. 469-477.

European Search Report for EP Application No. 14 82 9774 dated Feb. 1, 2017 (8 pages).

Extended European Search Report for European Patent Application No. 14828755.0 dated Sep. 12, 2017, 13 pages.

Chen, D. et al., "A New Factory Splice-On Fiber Optic Connector with High Performance and Reliability by Machine Automation", Optical Society of America, 3 pages (2016).

* cited by examiner

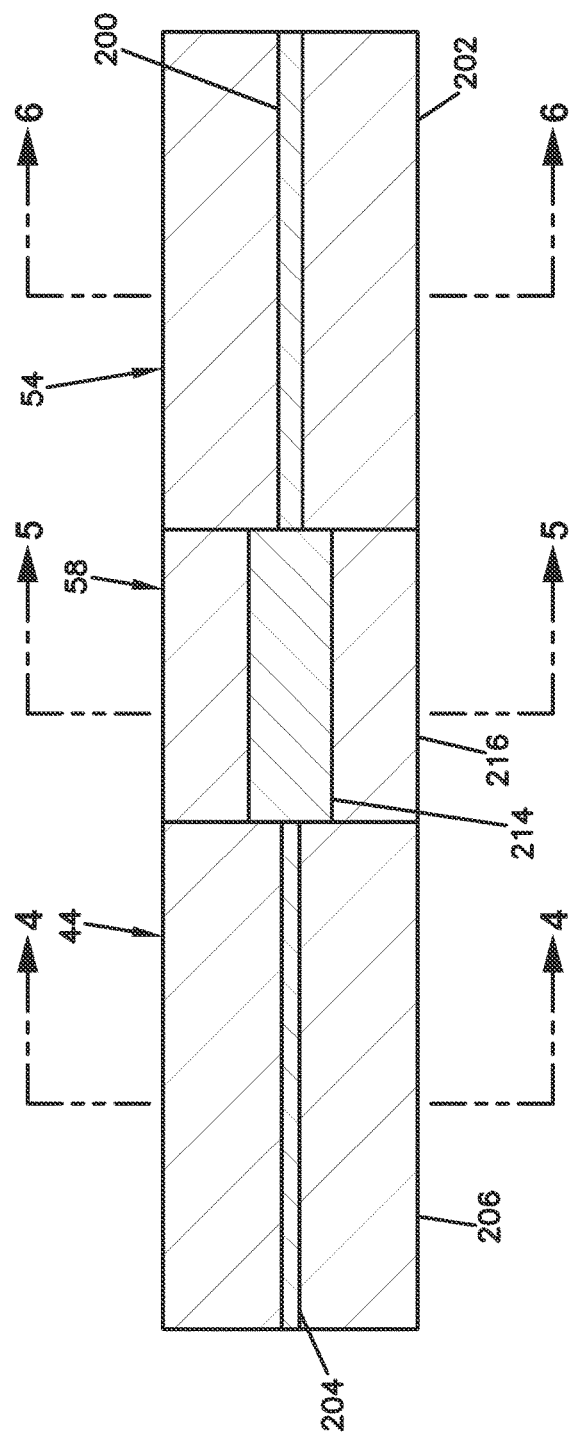

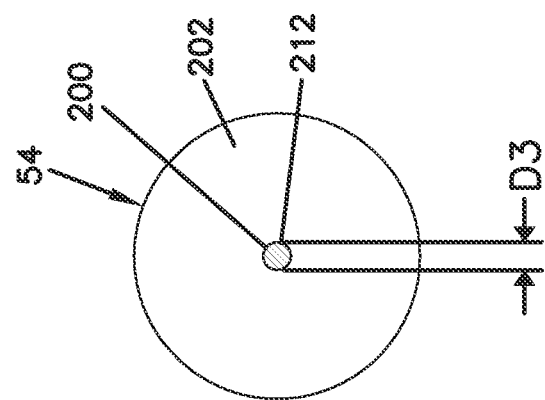
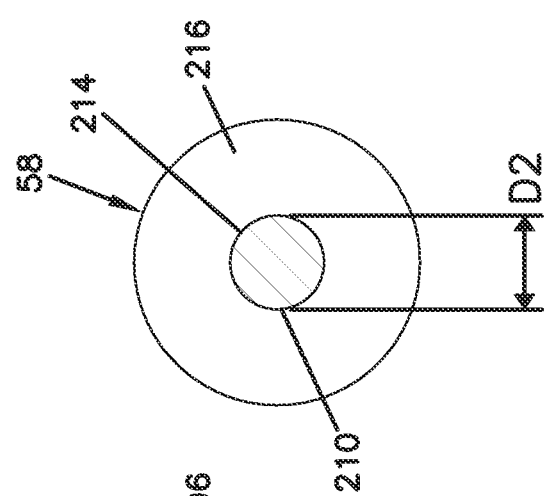
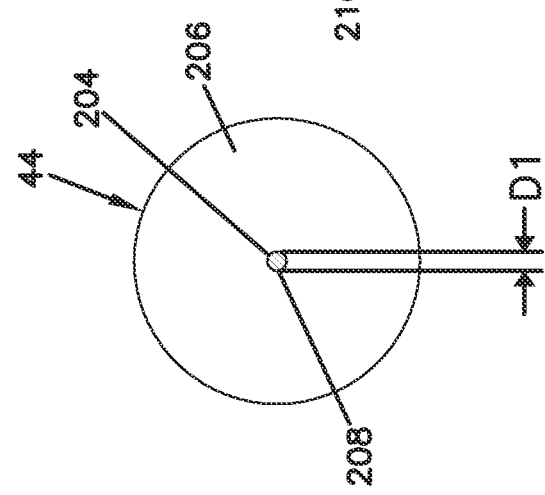

FIBER OPTIC CABLE CONNECTOR ASSEMBLY INCLUDING INTEGRATED ENHANCED FUNCTIONALITY

CROSS-REFERENCE TO RELATED APPLICATION(S)

This application is a Continuation of U.S. patent application Ser. No. 14/907,209, filed on Jan. 22, 2016, which is a National Stage of PCT International Patent Application No. PCT/US2014/047601, filed on Jul. 22, 2014, which claims benefit of U.S. Patent Application Ser. No. 61/857,040 filed on Jul. 22, 2013 the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connectors, fiber optic connector and cable assemblies and methods for manufacturing.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected and disconnected.

A typical fiber optic connector includes a ferrule assembly supported at a front end of a connector housing. The ferrule assembly includes a ferrule and a hub mounted to a rear end of the ferrule. A spring is used to bias the ferrule assembly in a forward direction relative to the connector housing. The ferrule functions to support an end portion of at least one optical fiber (in the case of a multi-fiber ferrule, the ends of multiple fibers are supported). The ferrule has a front end face at which a polished end of the optical fiber is located. When two fiber optic connectors are interconnected, the front end faces of their respective ferrules abut one another and the ferrules are forced together by the spring loads of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of a fiber optic adapter that receives the connectors, aligns the ferrules and mechanically holds the connectors in a connected orientation relative to one another.

Connectors are typically installed on fiber optic cables in the factory through a direct termination process. In a direct termination process, the connector is installed on the fiber optic cable by securing an end portion of an optical fiber of the fiber optic cable within a ferrule of the connector. After the end portion of the optical fiber has been secured within the ferrule, the end face of the ferrule and the end face of the optical fiber are polished and otherwise processed to provide an acceptable optical interface at the end of the optical fiber.

Connectors can also be installed on fiber optic cables using an optical splice. The optical splice can be mechanical splice or a fusion splice. Mechanical splices are often used for field terminated connectors. Fusion splices can be used to fusion splice the optical fiber of the fiber optic cable to the rear end of an optical fiber stub secured within a ferrule. United States Patent Application Publication Pub. No. US 2014/0064665 A1 discloses example splice-on connector configurations.

What is needed are cost effective and compact methods and structures for incorporating enhanced functionality into fiber optic connectors.

SUMMARY

Teachings of the present disclosure relate to methods, techniques and structures for incorporating enhanced functionality into splice-on connectors. In certain examples, such enhanced functionality can include signal filtration, signal monitoring, connector presence detection and other functionalities. In certain examples, a signal modification structure may be incorporated between a stub optical fiber supported by a ferrule and a corresponding optical fiber of a fiber optic cable. In certain examples, the signal modification structure may include signal filtration properties. In certain examples, the signal modification structure may include signal splitting or tapping properties. In certain examples, the signal modification structure may include signal reflecting properties. In certain examples, the signal modification structure is relative low cost and can be effectively incorporated into a fiber optic connector in accordance with an efficient manufacturing process. In certain examples, the signal modification structure provides enhanced functionality without substantially increasing the size or cost of the connector. In certain examples, the signal modification structure can include films, signal modification fibers or other structures.

One aspect of the present disclosure relates to a fiber optic cable and connector assembly. The assembly includes a cable optical fiber, a ferrule, a stub optical fiber having a first portion supported within the ferrule a second portion the projects rearwardly the ferrule and a signal modification fiber optically coupled between the stub optical fiber and the cable optical fiber. The signal modification fiber is configured to support multiple transmission modes over a predetermined signal wavelength range. The cable optical fiber and the stub optical fiber are configured to support a single transmission mode over the predetermined signal wavelength range. The assembly also includes a hub supporting the rear end of the ferrule and covering the second portion of the stub optical fiber and at least a portion of the signal modification fiber.

Another aspect of the present disclosure relates to a fiber optic cable and connector assembly. The assembly includes a cable optical fiber, a ferrule that has a front end and a rear end, the ferrule also defines a longitudinal bore, a stub optical fiber that has a first portion supported within the longitudinal bore and a second portion that projects rearwardly from the rear end of the ferrule, and a signal modification structure optically coupled between the stub optical fiber and the cable optical fiber. The signal modification structure can be configured at a desired splice angle to reflect certain wavelengths that are used to monitor the presence of optical connectors.

A further aspect of the present disclosure relates to a fiber optic cable and connector assembly. The assembly includes a cable optical fiber, a ferrule that has a front end and a rear end, the ferrule also defining a longitudinal bore, a stub optical fiber that has a first portion supported within the longitudinal bore and a second portion that projects rearwardly from the rear end of the ferrule, a signal modification structure optically coupled between the stub optical fiber and the cable optical fiber. The signal modification structure can be configured to extract part of an optical signal. The assembly includes at least one detector for detecting the presence of the extracted optical signal.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 3 is a schematic, longitudinal cross-sectional view showing the mode field for an optical fiber structure of the fiber optic cable and connector assembly of FIG. 1;

FIG. 4 is a cross-sectional view taken along section line 4-4 of FIG. 3;

FIG. 5 is a cross-sectional view taken along section line 5-5 of FIG. 3;

FIG. 6 is a cross-sectional view taken along section line 6-6 of FIG. 3;

DETAILED DESCRIPTION

Figure 1:
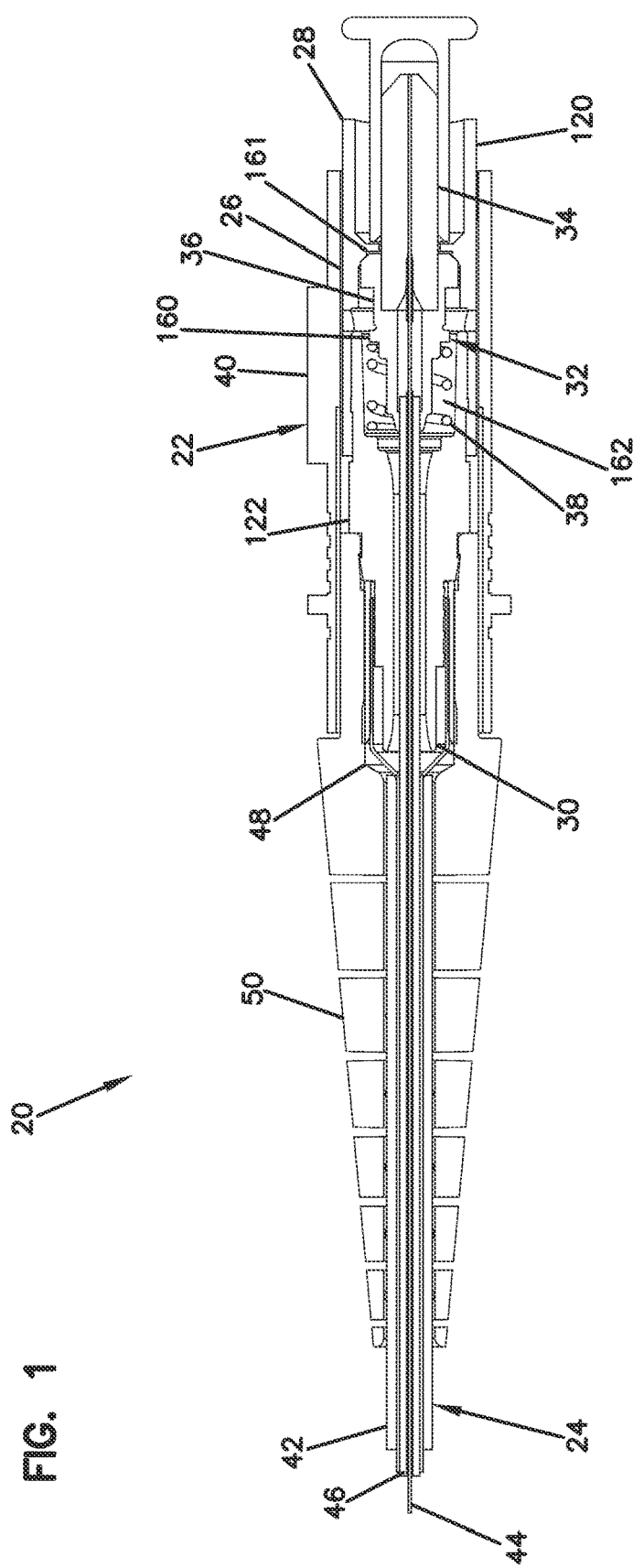
FIG. 1 is a longitudinal cross-sectional view of a fiber optic cable and connector assembly in accordance with the principles of the present disclosure.

FIG. 1 illustrates a fiber optic cable and connector assembly 20 in accordance with the principles of the present disclosure. The fiber optic cable and connector assembly 20 includes a fiber optic connector 22 secured to the end of a fiber optic cable 24. The fiber optic connector 22 includes a connector body 26 having a front end 28 and a rear end 30. The fiber optic connector 22 also includes a ferrule assembly 32 mounted within the connector body 26. Ferrule assembly 32 includes a ferrule 34 having a rear end supported within a ferrule hub 36. A spring 38 biases the ferrule assembly 32 in a forward direction relative to the connector body 26. The fiber optic connector 22 also includes a release sleeve 40 that is mounted over the connector body 26 that can be pulled-back relative to the connector body to release the front end 28 of the connector body 26 from a corresponding fiber optic adapter. The fiber optic cable 24 is shown including an outer jacket 42 that encloses a cable optical fiber 44 positioned within a protective buffer 46 (e.g., a buffer layer such as a loose buffer layer, a tight buffer layer or a loose/tight buffer layer). The fiber optic cable 24 also includes a strength layer 48 (e.g., aramid yarn or another type of tensile reinforcing material) positioned between the buffer tube 46 and the outer jacket 42. The strength layer 48 is shown anchored (e.g., crimped) to the rear end 30 of the connector body 26. The fiber optic connector 22 includes a tapered boot 50 that provides strain relief and/or fiber bend radius protection at the interface between the fiber optic connector 22 and the fiber optic cable 24.

Figure 2:
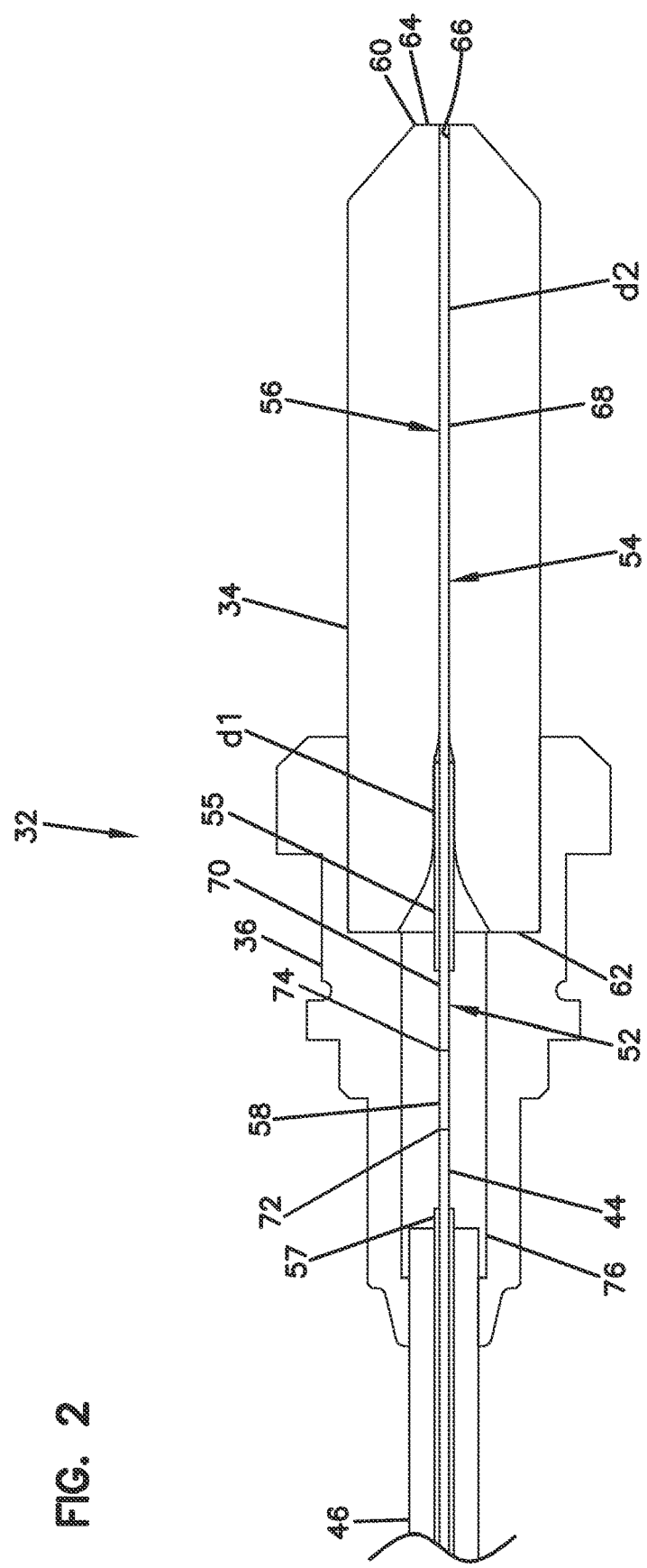
FIG. 2 is an enlarged view showing a ferrule hub and splice locations for the fiber optic cable and connector assembly of FIG. 1.

Referring to FIGS. 1 and 2, the fiber optic connector 22 includes a fiber structure 52 that is optically coupled (e.g., spliced) to the cable optical fiber 44. The fiber structure 52 includes an optical fiber stub 54 secured (e.g., adhesively affixed) within a longitudinal bore 56 of the ferrule 34. The optical fiber structure 52 also includes a signal modification structure 58 (e.g., a signal modification fiber) positioned between the cable optical fiber 44 and the optical fiber stub 54. The signal modification structure 58 can be configured to provide a variety of signal modification functions. For example, the signal modification structure 58 can function as a bandpass filter, as an edge filter (e.g., low to high or high to low), as a wavelength filter, as a splitter, or as a signal attenuator. In one example, the signal modification structure 58 can be a multi-mode interference filter that filters signals of a certain wavelength or wavelength range through multi-modal interference and reimaging. In certain examples, the signal modification structure 58 can be a film that reflects a certain wavelength which is used to monitor the presence of optical connectors in a network. This example is illustrated and described in more detail with reference to FIG. 8. In other examples, the signal modification structure 58 can be a splice beamsplitter that splits off part of an optical signal. The splice beamsplitter is illustrated and described in more detail with reference to FIG. 9.

As used herein, "mode field" means the portion of an optical fiber through which light passes during a transmission through the optical fiber of a light signal having a predetermined wavelength. It will be appreciated that the "mode field" of a given optical fiber may vary depending upon the wavelength of the light signal being transmitted therethrough. As used herein, the "mode field area" is the transverse cross-sectional area of the mode field at a given location of the optical fiber. The "mode field area" is typically circular and defines a mode field diameter across the mode field area. The mode field diameter can be defined at the location where the power density is reduced to $1/e^2$ of the maximum power density. The mode field area can also be referred to as a "spot area" or "beam area" and the mode field diameter can also be referred to as the spot size or beam width.

It will be appreciated by those of skill in the art that the fiber optic connector 22 depicted at FIG. 1 is an SC style connector. It will be appreciated that the various aspects of the present disclosure are also applicable to other types of connectors having different form factors. Example other types of connectors include LC connectors, ST connectors, or ruggedized/hardened connectors of the type disclosure at U.S. Pat. Nos. 7,744,286 and 7,090,407 which are hereby incorporated by reference.

Referring back to FIG. 1, the ferrule 34 can be positioned at least partially within the connector body 26 adjacent the front end 28 of the connector body 26. The ferrule 34 includes a front end 60 positioned opposite from a rear end

62. The front end 60 includes an end face 64 at which an interface end 66 of the optical fiber stub 54 is located. The longitudinal bore 56 of the ferrule 34 extends through the ferrule 34 from the front end 60 to the rear end 62. The optical fiber stub 54 includes a first portion 68 and a second portion 70. The first portion 68 can be secured within the longitudinal bore 56 of the ferrule 34 and the second portion 70 can extend rearwardly from the ferrule 34. The first portion 68 of the optical fiber stub 54 is preferably secured by an adhesive (e.g., epoxy) within the longitudinal bore 56 of the ferrule 34. The interface end 66 of the optical fiber stub 54 can include a polished end face accessible at the front end 60 of the ferrule 34. The optical fiber stub 54 can extend all of the way through the ferrule 34 without any splices within the ferrule 34.

In one example, the optical fiber stub 54 maintains a constant mode field diameter along its length. In one example, the optical fiber stub 54 is a step-index optical fiber having a core 200 (see FIG. 3) surrounded by a cladding 202 (see FIG. 3) with a discrete radial step in refractive index between the core and the cladding. In certain examples, the optical fiber stub 54 can function as a single-mode fiber for optical transmissions having wavelengths in the range of 1260 to 1650 nanometers by supporting a single fundamental mode over this range of wavelengths. In certain examples, the optical fiber stub 54 has a core diameter in the range of 5-15 microns or in the range of 8-12 microns, or in the range of 9-11 microns. In certain examples, the optical fiber stub 54 can have a cladding having an outer diameter in the range of 120 to 130 micrometers. In other examples, the optical fiber stub can accommodate multi-mode optical transmissions.

Referring to FIG. 2, the longitudinal bore 56 of the ferrule 34 can have a stepped diameter. For example, the longitudinal bore 56 can have a first diameter d1 that is larger than a second diameter d2. The first diameter d1 can be positioned at the front end of the ferrule 34 and the second diameter d2 can be positioned adjacent the rear end of the ferrule 34. In certain examples, the portion of the optical fiber stub 54 within the section of the longitudinal bore 56 having the first diameter d1 can be protected by a protective coating (e.g., acrylate or other polymeric material) and the portion of the optical fiber stub 54 within the section of the longitudinal bore 56 having the second diameter d2 includes bare glass (i.e., a glass core and cladding that is not surrounded by a protective coating).

In certain examples, the cable optical fiber 44 is a step-index optical fiber having a core 204 (see FIG. 3) surrounded by a cladding 206 (see FIG. 3). In a step index optical fiber, a discrete step in refractive index is provided radially between the core and the cladding. In one example, the cable optical fiber 44 can function as a single-mode fiber for optical transmissions having wavelengths in the range of 1260 to 1650 nanometers by supporting a single fundamental mode over this range of wavelengths. In certain examples, the cable optical fiber 44 has a core diameter in the range of 5 to 15 micrometers, or in the range of 8 to 12 micrometers, or of about 9-11 micrometers. In certain examples, the cable optical fiber 44 can be configured to accommodate multi-mode optical transmissions. Portions of the cable optical fiber 44 can be protected by a coating (e.g., acrylate or other polymeric material) that surrounds the cladding layer.

The signal modification structure 58 of the optical fiber structure 52 can be configured as an optical filter (e.g., a bandpass or edge filter) for filtering certain light wavelengths while allowing other wavelengths to pass therethrough. In one example, the optical fiber stub 54 is a step-index optical fiber having a core 214 surrounded by a cladding 216 with a discrete radial step in refractive index between the core and the cladding. In certain examples, signal modification structure 58 is designed to excite multiple guided modes in response to input signals within a predetermined range of wavelengths (e.g., 1260-1650 nanometers). In certain examples, the signal modification structure 58 has a core diameter greater than 10 micrometers, or greater than 20 micrometers, or greater than 30 micrometers, or greater than 40 micrometers, or greater than 50 micrometers. In other examples, the signal modification fiber segment has a core diameter within the range of 50 to 100 micrometers. In other examples, the signal modification structure 58 has a core diameter in the range of 10 to 125 micrometers. In still other examples, the signal modification structure 58 can have a cladding having an outer diameter in the range of 120 to 130 micrometers.

In certain examples, the signal modification structure 58 has a core diameter that is larger than the core diameter of the cable optical fiber 44 and is also larger than the core diameter of the optical fiber stub 54. In certain examples, the signal structure 58 has a mode field diameter that is larger than the mode field diameter of the cable optical fiber and is also larger than the mode field diameter of the optical fiber stub 54. In certain examples the core diameter of the signal modification structure 58 is at least 2, 3, 4 or 5 times as large as the core diameter of the cable optical fiber 44. In certain examples the core diameter of the signal modification segment 58 is at least 2, 3, 4 or 5 times as large as the core diameter of the optical fiber stub 54. In certain examples the mode field diameter of the signal modification structure 58 is at least 2, 3, 4 or 5 times as large as the mode field diameter of the cable optical fiber 44. In certain examples the mode field diameter of the signal modification structure 58 is at least 2, 3, 4 or 5 times as large as the mode field diameter of the optical fiber stub 54. By splicing the larger mode field diameter of the signal modification structure 58 between smaller mode field diameter segments 44, 54, modes excited in the signal modification structure 58 form an interference pattern that can be used to effectively modulate the spectrum of the input light signal. By selecting signal modification structures 58 with different properties/characteristics (e.g., length, core diameter, refractive properties, etc.), different spectral responses can be achieved via multi-modal interference and re-imaging.

Referring to FIG. 3, an example mode field configuration for the optical fiber structure 52 is depicted. As shown at FIG. 3, the signal modification structure 58 is a multi-mode fiber (i.e., a fiber that supports/excites multiple optical transmission modes across a pre-determined range of input signal wavelengths) that is spliced between the cable optical fiber 44 and the optical fiber stub 54 so as to provide an optical coupling between the cable optical fiber 44 and the optical fiber stub 54. The fibers 44, 54 can be single mode optical fibers (i.e., fibers support a single fundamental transmission mode across a pre-determined range of input signal wavelengths). The signal modification structure 58 is spliced to the cable optical fiber 44 at splice location 72 and the signal modification structure 58 is spliced to the optical fiber stub 54 at splice location 74. In a preferred example, the splice locations 72, 74 are positioned inside the ferrule hub 36 such that the ferrule hub 36 protects and encloses the splice locations 72, 74. It will be appreciated that at the time of splicing, the signal modification structure 58 can include a bare glass section, and the ends of the cable optical fiber 44 and the optical fiber stub 54 can also be bare glass (i.e., uncoated glass). After splicing, a protective buffer layer 76 can be provided over the splice locations 72, 74 and over the signal modification structure 58. Thereafter, the ferrule hub 36 can be positioned (e.g., over molded) over the rear end of the ferrule 34 and over the optical fiber structure 52. In this way, the second portion 70 of the optical fiber stub 54, the signal modification structure 58, an end portion of the cable optical fiber 44 and the rear end of the ferrule 34 can all be contained within the ferrule hub 36. The spring 38 can abut against the ferrule hub 36 to bias the ferrule assembly 32 in the forward direction. This allows for a compact, low cost connector in which the signal modification structure 58 is integrated within the connector body and can be fully protected within the hub. In other examples, the signal modification structure 58 may extend outside the hub.

Referring still to FIG. 3, the signal modification structure 58 provides a discrete increase (e.g., a step) in mode field diameter from the smaller core of the cable optical fiber 44 to the larger core of the signal modification structure 58 and also provides a discrete decrease in mode field diameter form the larger core of the signal modification structure 58 to the smaller core of the optical fiber stub 54. FIG. 4 shows a mode field area 208 of the cable optical fiber 44 having a mode field diameter D1. FIG. 5 shows a larger mode field area 210 of the signal modification structure 58 having a mode field diameter D2. FIG. 6 shows a mode field area 212 provided by the stub optical fiber 54. The mode field area 212 has a mode field diameter D3.

In the depicted example, splice location 74 is spaced rearwardly from the rear end of the ferrule 34. In certain examples, the splice location 74 is positioned no more than 20 millimeters from the rear end of the ferrule 34. In still other examples, the splice location 74 is positioned 5 millimeters or less from the rear end of the ferrule 34. In some examples, the first and second splice locations 72, 74 are fusion splices. The splice locations 72, 74 can include factory fusion splice. A "factory fusion splice" is a splice performed at a manufacturing facility as part of a manufacturing process. In certain examples, an active alignment system is used to align the fiber sections prior to splicing. In still other examples, the splices can be a field splices.

Referring back to FIG. 1, the connector body includes a front piece 120 and a rear piece 122. The front piece 120 forms the front interface end 28 of the fiber optic connector 22 and the rear piece 122 is configured to allow the strength layer 48 (e.g., aramid yarn, fiberglass or other strength members capable of providing tensile reinforcement to the fiber optic cable 24) of the fiber optic cable 24 to be anchored. In some examples, the strength layer 48 can be secured to the rear piece 122 of the connector body 26 with a mechanical retainer such as a crimped sleeve. In other examples, adhesive or other means can be used to secure the strength layer 48 to the connector body 26.

The front and rear pieces 120, 122 of the connector body 26 can interconnect the other by connection such as a snap fit connection, an adhesive connection or other type of connection. When the front and rear pieces 120, 122 are connected together, the spring 38 and the ferrule hub 38 are captured between the front and rear pieces 120, 122. The hub 36 can be shaped to include a flange 160 that engages the spring 38. Additionally, the hub 36 can be configured to support the rear end of the ferrule 34 within the connector body 26. Furthermore, a forward end of the flange 160 can be configured to engage a shoulder 161 within the connector body 26 to halt forward movement of the ferrule assembly 32 caused by the forward bias of the spring 38. The spring 38 can be captured within a spring pocket 162 defined by the rear piece 122 and, as described above, can function to bias the ferrule assembly 32 in a forward direction relative to the connector body 26. The hub 36 is a structure secured on the ferrule 34 such that the ferrule 34 and the hub 36 move together as a unit relative to the connector body 26. As described above, the hub 36 can include structure that interferes with an internal structure (e.g., a stop) of the connector body 26 to limit the forward movement of the ferrule assembly 32 and to prevent the ferrule assembly 32 from being pushed out the front end of the connector body 26 by the spring 38.

As described above, the fiber optic connector 22 is shown having an SC-type intermatability profile. As such, the fiber optic connector 22 can be adapted to be received within an SC-type fiber optic adapter that is used to couple two of the connectors together to provide an optical connection therein between. When the fiber optic connector 22 is inserted within a fiber optic adapter, exterior shoulders of the connector body 26 are engaged by latches of the fiber optic adapter to retain the fiber optic connector 26 within the fiber optic adapter. To release the fiber optic connector 22 from the adapter, the release sleeve 40 is slid rearwardly relative to the connector body 26 thereby causing the latches of the fiber optic adaptor to disengage from the exterior shoulders of the connector body 26 such that the fiber optic connector 22 can be withdrawn from the fiber optic adaptor. An example fiber optic adaptor is disclosed at U.S. Pat. No. 5,317,663 which is hereby incorporated by reference in its entirety.

The interface end 66 of the optical fiber stub 54 can be polished in a conventional fashion to produce conventional end face geometry such as, but not limited to, straight, flat, curved or slanted configurations without modifying the length and degree of expansion provided by the signal modification structure 58. The ferrule 34 can be constructed of a relatively hard material capable of protecting and supporting the first portion 68 of the optical fiber stub 54. In one example, the ferrule 34 has a ceramic construction. In other examples, the ferrule 34 can be made of alternative material such as Ultem, thermoplastic material such as polyphenylene, sulfide (PPS), or other engineering plastics or metals. In certain examples, the ferrule 34 can have a longitudinal length in the range of 5-15 millimeters.

In some examples, the hub 36 can have a polymeric construction that has been overmolded over the rear end of the ferrule 34 and over the splice locations (e.g., splice locations 72 and 74 or splice locations 72, 74 and 80). Additionally, in certain examples, the overmolded hub 36 can be formed of a hot melt adhesive or other material that can be applied and cured at relatively low molding temperatures and pressures. The ferrule hub 36 can also be formed from a UV curable material (i.e., materials that cure when exposed to ultraviolet radiation/light), for example, UV curable acrylates, such as OPTOCAST™ 3761 manufactured by Electronic Materials, Inc. of Breckenridge, Colo.; ULTRA LIGHT-WELD® 3099 manufactured by Dymax Corporation of Torrington, Conn.; and 3M™ Scotch-Weld™ manufactured by 3M of St. Paul, Minn. The use of UV curable materials is advantageous in that curing can occur at room temperature and at generally lower pressures (e.g., less than 30 kpsi, and generally between 20-30 kpsi). The availability of low pressure curing helps to insure that the components, such as the optical fibers, being overmolded are not damaged during the molding process. By protecting the splices within the hub at a location in close proximity to the ferrule 36, it is possible to manufacture a fiber optic connector that is relatively short in length. Providing one or more of the splice locations within 5 millimeters of the rear end of the ferrule 34 assists in designing the fiber optic connection in compliance with standard industry for customer side load and connector length specifications (e.g., GR-326 size load and length requirements).

Figure 7:
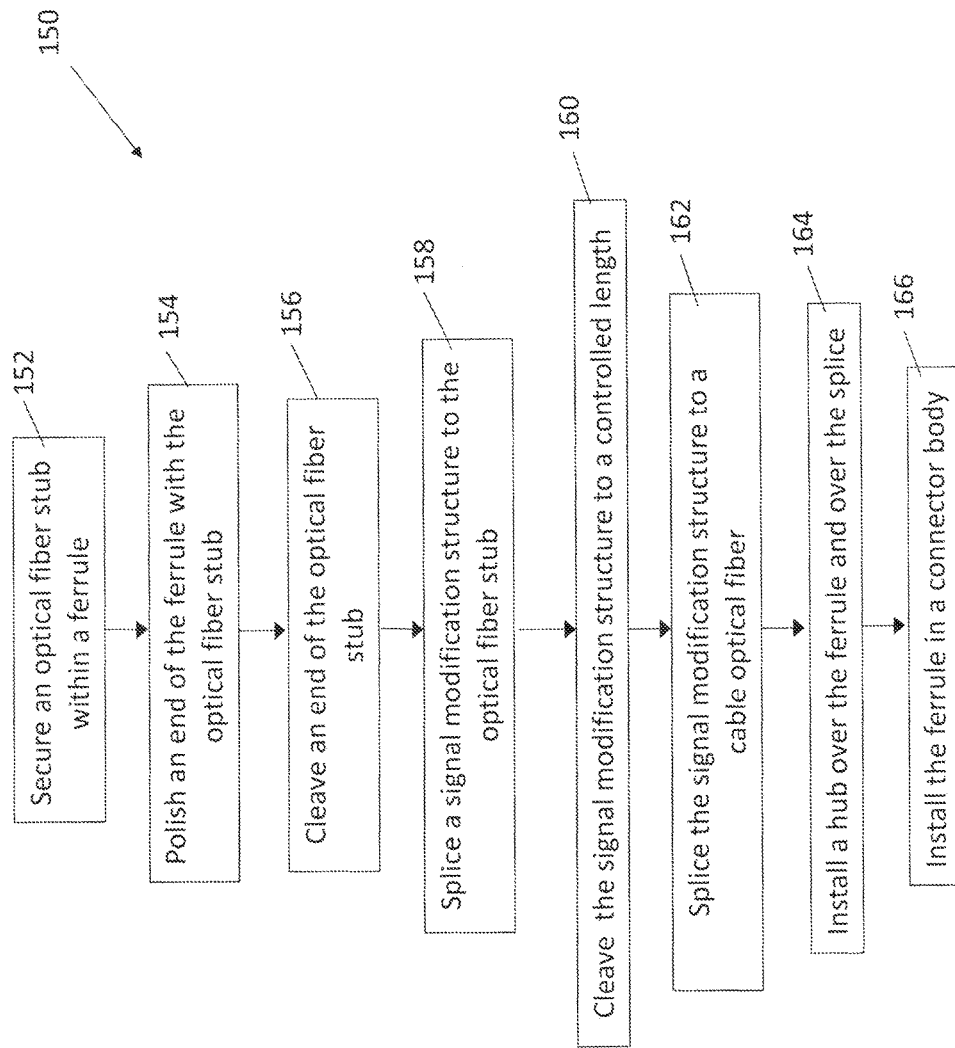
FIG. 7 is a flow chart illustrating an example method in accordance with the principles of the present disclosure for manufacturing the fiber optic cable and connector assembly of FIG. 1.

FIG. 7 is a flow chart illustrating an example method 150 for manufacturing the fiber optic cable and connector assembly 20. In this example, the method 150 includes operations 152, 154, 156, 158, 160, 162, 164 and 166.

The operation 152 is performed to secure the optical fiber stub 54 in the ferrule 74. As previously described, the optical fiber stub 54 can be adhesively secured within the bore of the ferrule 34.

The operation 154 is performed to polish the end face 64 of the ferrule 34 and the corresponding interface end 66 of the optical fiber stub 54 secured within the ferrule 34. The end face of the interface end 66 of the optical fiber stub 54 can be polished having a desired geometry.

The operation 156 is performed to cleave the rear end of the optical fiber stub 54. In one example, after cleaving, the rear end of the optical fiber stub 54 can be within 5 millimeters of the rear of the ferrule 34.

The operation 158 is performed to splice the signal modification structure 58 to the rear end of the optical fiber stub 54.

The operation 160 is performed to cleave the signal modification segment 58 to a controlled length. The length of the signal modification structure 58 can be controlled to achieve desired filtration properties or other optical properties. Both ends of the signal modification structure 58 can be cleaved prior to splicing to the optical fiber stub 54, or one end of the signal modification structure 58 can be cleaved after splicing to the fiber optic stub 54.

The operation 162 then is performed to splice the signal modification structure 58 to the cable optical fiber 44.

The operation 164 is performed to install the ferrule hub 36 over the rear end of the ferrule 34 and over the splice locations. The ferrule hub 36 can contain and protect the signal modification structure 58 and the various splices used to couple the signal modification structure 58 between the optical fiber stub 54 and the cable optical fiber 44.

The operation 166 is performed to install the ferrule assembly 32 in the connector body 26. In certain embodiments, the rear connector piece 122 and the spring have been slid over the cable optical fiber 44 prior to over molding the hub. In this step, the ferrule assembly 32 is loaded into the front piece 120, the spring is slid from the cable optical fiber 44 to a position behind the hub and within the front connector piece 120, and the rear connector piece is slid forwardly from the cable optical fiber 44 into engagement with the front connector piece 122 thereby capturing the hub and the spring between the front and rear connector pieces 120, 122.

Another aspect of the present disclosure relates to a method for mass producing and distributing fiber optic connector assemblies. One aspect of the method relates to the centralized manufacturing of large quantities of ferrules having optical fiber stubs mounted therein. The optical fiber stubs can be of the type described herein. In certain examples, the volume of the ferrule and stub combinations manufactured at a given centralized location can exceed a volume of 500,000; 1,000,000; 2,000,000; or 3,000,000 per year. The ferrule and stub combinations can be manufactured in a first factory location using highly precise polishing technology and equipment. The first factory location can be used to manufacture the ferrule and stub assemblies according to method operations 152-154 such that the ferrule assemblies manufactured at the central location each include a ferrule 34 and an optical fiber stub 54 of the type described herein.

The method also leads to distributing the ferrule and stub assemblies manufactured at the first factory location to regional factories/mass production locations closer to the intended point of sales. During shipping of the ferrule and stub assemblies, the rear portions 70 of the optical fiber stubs 54 can be coated with a protective coating layer (e.g., acrylate) to provide protection during transit, and or covered with a protective cap secured to the back end of the ferrule. Similarly, dust caps can be proved over the front ends of the ferrules 34. The ultimately small size of the ferrule and stub fiber assemblies allows large, large volumes of such ferrule and stub fiber assemblies to be effective shipped at relatively low cost. High costs associated with extensive shipment of cable can be significantly reduced. At the regional locations, the protective coatings can be stripped from the fiber stubs and operations 156-166 can be performed at the regional factory locations to splice the signal modification structure 58 to the optical fiber stubs 54 and to splice the signal modification structure 58 to the cable optical fibers 44.

Aspects of the present disclosure allow ferrule assemblies to be manufactured in large volumes at manufacturing locations where the process is most class effective. The ferrule assemblies, which are small in size, can be effectively stripped in bulk to factory/assembly locations closer to customer locations where the ferrule assemblies can be spliced to fiber optic cables and a final connector assembly can take place. In this way, shipping of the cable itself (which tends to be larger in size and weight) can be minimized. Also, final assembly can be made closer to customer locations thereby increasing lead times. Global supply chains can also be enhanced.

In other embodiments, steps 152-160 can be performed at the central manufacturing location. Once the optical fiber stubs 54 have been processed with the ferrules 34 and the signal modification structure 58 have been spliced to the optical fiber stubs, protective caps (e.g., dust caps, can be placed over the front and rear ends of the ferrules to protect the interface ends 66 of the optical fiber stubs 54 as well as the signal modification structure 58 and their corresponding splices. Thereafter, the protected ferrule assemblies can be shipped to regional locations for final assembly on a cable (e.g., steps 162-166).

Figure 8:
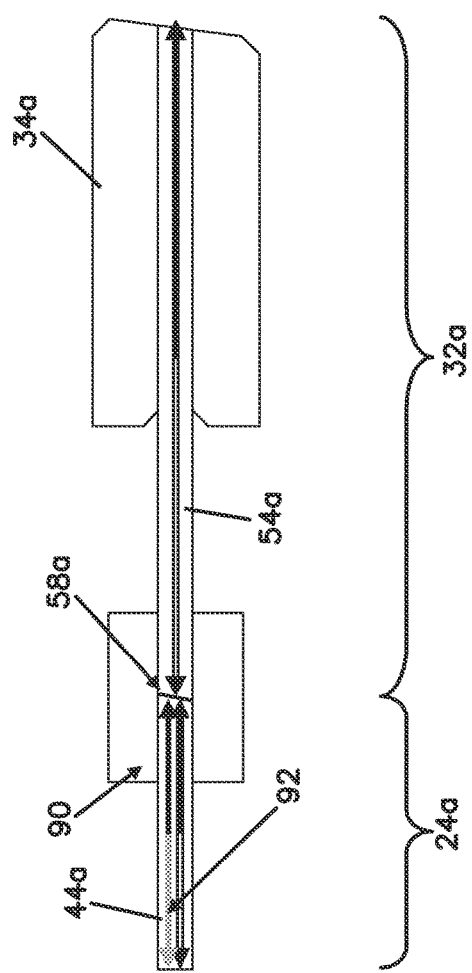
FIG. 8 is a schematic, longitudinal cross-sectional view of an alternate embodiment of a signal modifying structure in accordance with the principles of the present disclosure.

Referring to FIG. 8, a schematic view of a fiber optic cable 24a and a ferrule assembly 32a is shown. In this example, the signal modification structure 58a is a film coating applied at a splice joint. In one example, the film coating can function as a wavelength selective filter (WDM) for reflecting certain wavelengths. The determination of the specific wavelength reflected can be controlled by the angle of the filter.

Similar to the signal modification structure 58 described above, the signal modification structure 58a can be spliced between the cable optical fiber 44a and the optical fiber stub 54a so as to provide an optical coupling between the cable optical fiber 44a and the optical fiber stub 54a. For the sake of brevity, only those portions of this example that differ from the example illustrated in FIGS. 1-7 discussed above will be described in detail. In the example shown, the splice can be covered with an overmold 90 behind or separate from the hub. It will be appreciated that the splice can also be inside the hub as described above in reference to FIGS. 1-2.

The signal modification structure 58a can be used to reflect a certain wavelength which can be used to monitor the presence of optical connectors in a network. In order to achieve the proper reflection of wavelengths, the angle of the signal modification structure 58a is controlled. For example, when the signal modification structure 58a is applied to a perpendicular splice (e.g., 0° angle of incidence) too much light may be reflected at the signal wavelength (1310, 1550 nm). This can result in an undesirable return loss (RL) for the connector. On the other hand, when the signal modification structure 58a is applied to an 8° splice angle, only a small amount of the light (e.g., monitor wavelength, 1400 nm) will be coupled back into the fiber. For example, if the signal modification structure 58a is perfectly reflective at the monitor wavelength, the reflected monitor signal 92 will be about 70 dB less than the initial monitor signal.

In one example, the splice angle can be between about 0° and 8°. The determination of the angle may also depend on filter characteristics. It will be appreciated that the angle may vary in other embodiments. For example, the signal modification structure 58a can be manufactured such that 100% (0 dB) of the monitor wavelength (1400 nm) is reflected, and −30 dB of the transmitted signal wavelengths (1310, 1550 nm) are reflected. In such example, the splice angle can be between about 5° and 7° resulting in a return loss of about 30 to 60 dB at the monitor wavelength (1400 nm) and 60 to 90 dB at the signal wavelengths (1310 and 1550 nm). The reflected signal is then used to detect the presence of a connector in the network.

Figure 9:
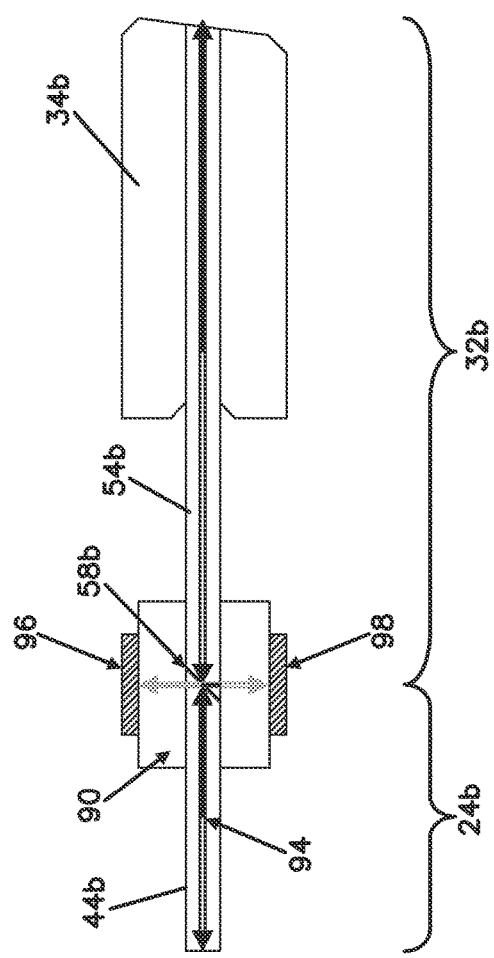
FIG. 9 is a schematic, longitudinal cross-sectional view of another alternate embodiment of a signal modifying structure in accordance with the principles of the present disclosure.

Referring to FIG. 9, a schematic view of a fiber optic cable 24b and a ferrule assembly 32b is shown. In this example, the signal modification structure 58b is a splice beam splitter. The splice beam splitter can be used to monitor bi-directional optical signals 94 in a fiber optic cable 24b. For example, a portion of the signal be extracted/tapped (e.g., split off) from the main signal path and directed to monitoring equipment for providing continuous signal monitoring.

Similar to the signal modification structure 58 described above, the signal modification structure 58b can be spliced between the cable optical fiber 44b and the optical fiber stub 54b so as to provide an optical coupling between the cable optical fiber 44b and the optical fiber stub 54b. For the sake of brevity, only those portions of this example that differ from the example illustrated in FIGS. 1-7 discussed above will be described in detail.

As shown, the splice beam splitter can be covered with an over mold 90. The over mold 90 may be transparent at the wavelengths of the optical signal. As described above, the splice may be made in the factory or in the field. The signal modification structure 58b may include both factory and field fibers that are cleaved at equal angels. The factory or field fibers may be standard or bend-insensitive single mode or multimode fiber. The fibers can be aligned such that the fiber faces are coplanar. In one example, the surface of the field fiber can be prepared such that the splice reflects a small amount of light from the optical signal path. The signal modification structure 58b can be used to extract off part of the signal such that the signal can be read by a first detector 96 and a second detector 98. The first and second detectors 96, 98 can include a large area having a low speed to allow as much light to be collected as possible. This structure allows for the detection of the presence of optical signals while making it impossible to intercept high-speed data. In one example, the detectors 96, 98 are placed on opposite sides of the over mold 90.

In the example shown, a 45° cleave angle is shown, resulting in reflections at 90° from the fiber axes. It will be appreciated that a smaller angle may be used in other embodiments. The placement of the detectors and the shape of the over mold material can be adjusted accordingly. The optical data path can be unaffected by the presence of the signal modification structure 58b. The transmitted signal reduction can be less than about 0.1 dB. In other examples, the signal reduction can be as low as about 0.01 dB. To minimize modal noise introduced when the fiber cores are offset, the spliced fibers will be coaxial (e.g., aligned fiber cores).

The signal modification structure 58b provides for a flat surface resulting in the most efficient way to extract light from the optical signal path to the detectors 96, 98. Light can be reflected away from the fiber core to the detectors 96, 98. The over mold material can be transparent to match the index of refraction of the fiber cladding. This allows the light to propagate from the signal modification structure 58b as a Gaussian beam which will diverge very little over the short distance to the detectors 96 98. In one example, the distance can be about 1 millimeter (mm). One connector can independently detect optical traffic bi-directionally.

One example of manufacturing a signal modification structure 58b includes applying a dielectric coating to the factory fiber. The coating may consist of a single layer of glass, or may contain several layers of different glasses deposed using stand coating methods (e.g., evaporative coating, chemical vapor deposition, sputtering, etc.). The thickness of the coating can be between about 0.1 and 10 micrometers (μm). In certain examples, it may be possible to adjust the splicing parameters such that the resulting splice creates a small reflection, forming the signal modification structure 58b. For example, the arc treatment used to clean the fiber tips prior to splicing may be optimized to provide a small reflection at the splice joint. In other examples, it may be possible to introduce a gas that will form a coating on the fiber ends when the pre-cleaning arc is performed.

From the foregoing detailed description, it will be evident that modifications and variations can be made without departing from the spirit and scope of the disclosure.

What is claimed is:

1. A fiber optic cable and connector assembly comprising:
   a cable optical fiber;
   a ferrule having a front end and a rear end, the ferrule also defining a longitudinal bore;
   a stub optical fiber having a first portion supported within the longitudinal bore and a second portion that projects rearwardly from the rear end of the ferrule;
   a signal modification fiber optically coupled between the stub optical fiber and the cable optical fiber, the signal modification fiber being fusion spliced directly to the cable optical fiber at a first splice location at a first end of the signal modification fiber, and the signal modification fiber being fusion spliced directly to the stub optical fiber at a second splice location at a second end of the signal modification fiber, the signal modification fiber being configured to support multiple transmission modes over a predetermined signal wavelength range, the signal modification fiber, the stub optical fiber, and the cable optical fiber each having a constant mode field diameter along its length;
   the cable optical fiber and the stub optical fiber being configured to support a single transmission mode over the predetermined signal wavelength range.

2. The fiber optic cable and connector assembly of claim 1, wherein the signal modification fiber functions as a bandpass filter.

3. The fiber optic cable and connector assembly of claim 1, wherein the signal modification fiber functions as an edge filter.

4. The fiber optic cable and connector assembly of claim 1, wherein the signal modification fiber is a stepped index fiber having a having a stepped refractive index profile defined radially between a core and a cladding of the signal modification fiber.

5. The fiber optic cable and connector assembly of claim 1, wherein the cable optical fiber and the stub optical fiber have a core diameter in the range of 8-12 microns, and wherein the signal modification fiber has a core diameter of at least 20 microns.

6. The fiber optic cable and connector assembly of claim 5, wherein the core diameter of the signal modification structure is at least 30 microns.

7. The fiber optic cable and connector assembly of claim 5, wherein the core diameter of the signal modification fiber is at least 40 microns.

8. The fiber optic cable and connector assembly of claim 5, wherein the core diameter of the signal modification fiber is at least 50 microns.

9. The fiber optic cable and connector assembly of claim 1, further comprising a hub supporting the rear end of the ferrule and covering the second portion of the stub optical fiber and at least a portion of the signal modification fiber.

10. The fiber optic cable and connector assembly of claim 1, wherein the stub optical fiber extends at least 1 millimeter from the rear end of the ferrule.

11. A fiber optic cable and connector assembly comprising:
a cable optical fiber;
a ferrule having a front end and a rear end, the ferrule also defining a longitudinal bore;
a stub optical fiber having a first portion supported within the longitudinal bore and a second portion that projects rearwardly from the rear end of the ferrule; and
a signal modification structure optically coupled between the second portion of the stub optical fiber and the cable optical fiber, the signal modification structure being fusion spliced directly to the cable optical fiber at a first splice location at a first end of the signal modification structure, and the signal modification structure being fusion spliced directly to the second portion of the stub optical fiber at a second splice location at a second end of the signal modification structure, the signal modification structure being configured to provide a functionality selected from the group consisting of: signal splitting; signal filtration; and signal reflection, the signal modification structure, the stub optical fiber, and the cable optical fiber each having a constant mode field diameter along its length.

12. The fiber optic cable and connector assembly of claim 11, wherein the stub optical fiber extends at least 1 millimeter from the rear end of the ferrule.

13. The fiber optic cable and connector assembly of claim 11, wherein the signal modification structure is a stepped index fiber having a having a stepped refractive index profile defined radially between a core and a cladding of the signal modification structure.

14. The fiber optic cable and connector assembly of claim 11, wherein the cable optical fiber and the stub optical fiber have a core diameter in the range of 8-12 microns, and wherein the signal modification structure is a fiber with a core diameter of at least 20 microns.

15. The fiber optic cable and connector assembly of claim 11, wherein the signal modification structure is configured to support multiple transmission modes over a predetermined signal wavelength range.

16. The fiber optic cable and connector assembly of claim 15, wherein the cable optical fiber and the stub optical fiber are configured to support a single transmission mode over the predetermined signal wavelength range.

17. A fiber optic cable and connector assembly comprising:
a cable optical fiber;
a ferrule having a front end and a rear end, the ferrule also defining a longitudinal bore;
a stub optical fiber having a first portion supported within the longitudinal bore and a second portion that projects rearwardly from the rear end of the ferrule;
a signal modification structure optically coupled between the second portion of the stub optical fiber and the cable optical fiber, the signal modification structure being fusion spliced directly to the cable optical fiber at a first splice location at a first end of the signal modification structure, and the signal modification structure being fusion spliced directly to the second portion of the stub optical fiber at a second splice location at a second end of the signal modification structure, the signal modification structure, the stub optical fiber, and the cable optical fiber each having a constant mode field diameter along its length, the signal modification structure being configured to extract part of an optical signal; and
at least one detector for detecting the presence of the extracted optical signal.

18. The fiber optic cable and connector assembly of claim 17, wherein the stub optical fiber extends at least 1 millimeter from the rear end of the ferrule.

19. The fiber cable and connector assembly of claim 17, wherein the extracted optical signal is 90° from a fiber axes.

20. The fiber cable and connector assembly of claim 17, wherein the at least one detector monitors bi-directional optical signals in the cable optical fiber.

* * * * *